United States Patent Office 3,379,621
Patented Apr. 23, 1968

3,379,621
MICROBIOLOGICAL PREPARATION OF $\Delta^{1,3,5(10)}$-3-HYDROXY STEROIDS
Carlos Casas-Campillo, Mexico City, Mexico, assignor to Syntex Corporation, Panama, Panama, a corporation of Panama
No Drawing. Filed May 17, 1965, Ser. No. 456,492
Claims priority, application Mexico, June 12, 1964, 77,596
15 Claims. (Cl. 195—51)

ABSTRACT OF THE DISCLOSURE

Microbiological process for preparing $\Delta^{1,3,5(10)}$-3-hydroxy steriods by subjecting the corresponding $\Delta^5$-3$\beta$,19-dihydroxy derivatives or the 3-monoacylates, 19-monoacylates, and 3,19-diacylates thereof to the action of a culture of *Mycobacterium phlei*, the ring A aromatic steroids thus produced having known pharmaceutical uses.

This invention is related to a novel procedure for the preparation of cyclopentanopolyhydrophenanthrene derivatives.

In particular, this invention relates to a novel procedure for the preparation of $\Delta^{1,3,5(10)}$-3-hydroxy steriods from the corresponding $\Delta^5$-3$\beta$,19-dihydroxy compounds or from the 3-monoacylates, 19-monoacylates or 3,19-diacylates thereof, which comprises incubating said $\Delta^5$-steroids used as starting material with a culture of different strains of the microorganism *Mycobacterium phlei* or with the enzymes produced thereby.

The novel procedure of the present invention may be used for treating $\Delta^5$-3$\beta$,19-dihydroxy steroids of the androstane, pregnane and sapogenin series or the acylates thereof, preferably those which have from 18 to 27 carbon atoms inclusive.

These starting materials may contain the conventional substituents at C-17, for example a ketonic group, a free or esterified 17$\beta$-hydroxy group, either alone or with hydrocarbon substituents at C-17$\alpha$, for example a 17$\alpha$-lower alkyl group, such as methyl, ethyl, propyl, etc., a 17$\alpha$-lower alkenyl group, such as vinyl or similar groups or a 17$\alpha$-lower alkinyl group, such as ethinyl or similar groups, as it is frequently found in compounds of the androstane series; a 17$\beta$-acetyl group present, alone or together with a 17$\alpha$-hydroxy or acyloxy group, or the dihydroxy acetone side-chain, wherein the hydroxyl groups may be free, esterified or converted into a bismethylenedioxy derivative, as is common to find in compounds of the pregnane series. In addition, the starting materials may have substituents which will not interfere with the reaction in one or more of the positions 1, 2, 4, 7, 8, 9, 11, 12, 13, 14, 15, 16, 18, 20 and 21 of the steroid nucleus and side chains, for example ketonic groups or the derivatives thereof, e.g., enol esters or ketal derivatives; hydroxy groups or the derivatives thereof, such as, for example, esters, ethers, acetals or ketals; halogen atoms such as, for example, fluorine or chlorine, alkyl groupings such as methyl, ethyl, propyl, etc.

The acyloxy and acyl groups referred to hereinbefore are derived preferably from hydrocarbon carboxylic acids which contain less than 12 carbon atoms, which may be saturated or unsaturated, of straight, branched, cyclic or cyclic-aliphatic, aromatic chain and which may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and $\beta$-chloropropionate.

The acyloxy groups present in the steroid used as starting material are generally hydrolyzed during the process, to give the corresponding free hydroxyls. In addition, the primary or secondary free hydroxyls in positions other than C-3, 19 or 21, for example a 17$\beta$-hydroxy group, are generally oxidized to give a ketonic group. Nevertheless, none of these factors affect substantially the conversion of the $\Delta^5$-3$\beta$,19-dihydroxy or diacyloxy moiety to the 3-hydroxy A-aromatic ring grouping. Thus, for example, when there is treated the $\Delta^5$-androstene-3$\beta$,17$\beta$,19-triol or its 3,17-diacetate, according to the process of the present invention, there is obtained estrone in excellent yield.

The process of the present invention involves the incubation of a culture of *Mycobacterium phlei* and especially of the strains ATCC 10142, ATCC 11728 and the strain W received originally from the Rutgers University, New Jersey, with a $\Delta^5$-3$\beta$,19-dihydroxy steroid of the type defined hereinbefore under aerobic conditions in an adequate liquid medium containing a source of nitrogen, preferably proteinic, a source of carbon, an inorganic salt and sterile water and may include, optionally, a source of cofactors. This form of proceeding causes the enzymes of the microorganism to attack the steriod in order to effect the aromatization of ring A, without accumulation of the intermediate 19-hydroxy $\Delta^4$-3-keto compound. The action of the enzymes is not limited only to when the microorganism is present, for even though this is preferable because it renders the operation more facile, the enzymes alone, in a suitable medium, may cause the same changes.

The culture medium employed for the incubation may contain, as a source of nitrogen, peptone, meat extract or other commercial products such as Phytone (product of the enzymatic digestion of soya meal; Baltimore Biol. Lab., Baltimore, Md.), Casitone, Edamine, Nutrient L-1 (product of the hydrolysis of lactalbumin; Sheffield Farms, Norwich, N.Y.), any usual peptone in microbiological cultures and similar compounds. The source of carbon may be a carbohydrate, such as for example glucos, starch, cane sugar, lactose, maltose, glycerine, etc. The inorganic salt may be a halide, phosphate, sulfate or nitrate of an alkaline or an alkaline earth metal, for example, sodium chloride, calcium chloride, potassium sulfate, sodium nitrate, magnesium sulfate, monopotassium phosphate, or any other salt known to those skilled in the art which is used in microbiological cultures. Optionally, it is possible to include as source of cofactors, for example yeast extract or any other usual source. Of course, if it is desired, there may be employed combinations of more than one source of nitrogen and/or carbon and more than one salt.

The starting steroid may also be treated with enzymatic preparations of *Mycobacterium phlei* and especially of the strains indicated hereinbefore, following methods well known to those skilled in the art, such as the destruction of the cells in an aqueous pH buffer medium by means of homogenizers, vibrators of the Mickle type, or ultrasonic vibrators, followed by the centrifugation of the cells and treatment of the steroid with the overfloating liquid, during approximately from 2 to 10 hours.

The incubation of the aforesaid microorganism in the presence of the steroid may be effected between approximately 20° C. and 40° C., preferably between 25° C. and 30° C., during a time which may vary between about 24 and 96 hours, preferably between approximately 48 and 72 hours.

The isolation of the steroid is carried out by the usual methods, such as extraction from the incubation medium with an organic solvent immiscible with water, for example, a halogenated hydrocarbon such as methylene chloride, ethylene dichloride, chloroform, trichloroethane, and the like, aromatic homocyclic solvents, e.g., benzene, toluene, xylene and other similar solvents, followed by the evaporation of the extract, the final product being purified by known methods, the most common ones being chromatography or crystallization.

The steroid may be put in contact with the microorganism following several methods, for example: in a medium wherein the latter has already been incubated during about from 2 to 7 days there are added the steroid, in a sterile medium and the cells of the microorganism (which may be separated from the original incubation medium by conventional procedures, such as centrifugation) either simultaneously or separated by short periods of time; or by any other technique known to those skilled in the art and which is conventional in microbiological incubations of steroids. In any of the above methods, the steroid may be added, either in solid form or in form of a solution or suspension in a solvent which will not affect the microorganisms, such as alcohol, acetone, dioxane, or any other solvent conventional in microbiological incubations. The amount of starting steroid may vary between approximately 0.001 and 0.5% in weight of the total mixture.

The yields of the final $\Delta^{1,3,5(10)}$-3-hydroxy steroid vary according to factors such as the starting steroid, culture medium, the time and temperature of the incubation, the strain of *Mycobacterium phlei* used, etc. For example, there may be cited as optimum conditions of incubation of the strain W of *Mycobacterium phlei* (Rutgers University) in the presence of $\Delta^5$-androstene-3$\beta$,19-diol-17-one: stirring during 48 hours at 28° C., thus, there being obtained estrone in 80 to 90% yield with respect to the weight of the starting material.

The process of the present invention makes possible the obtention, in one single step and high yields, of steroids with an A-aromatic ring which are of great importance in pharmaceutical uses. Examples of aromatic steroids of importance known to those skilled in the art are: estrone, 17$\alpha$-ethinyl estradiol, 17$\alpha$-methyl estradiol, etc.

The following specific examples serve to illustrate, but are not intended to limit the scope of the present invention.

EXAMPLE I

The surface growth obtained by incubation of *Mycobacterium phlei*, strain W of the Rutgers University in Emerson agar medium slant (4 g. of meat extract, 4 g. of peptone, 2.5 g. of sodium chloride, 1 g. of yeast extract, 10 g. of glucose, 1000 cc. of distilled water and 15 g. of agar) during 1 week at 28° C. was suspended in 10 cc. of sterile water. Aliquots of 1 cc. of this suspension were used to inoculate 40, 125 cc. Erlenmeyer flasks, each containing 25 cc. of Emerson broth (4 g. of meat extract, 4 g. of peptone, 2.5 g. of sodium chloride, 1 g. of yeast extract, 10 g. of glucose and 1000 cc. of distilled water). After 6 days of incubation with stirring (using rotatory shakers at 250 r.p.m.) there were added, to each flask, 5 mg. of $\Delta^5$-androstene-3$\beta$,19-diol-17-one in 0.1 cc. of dioxane and the incubation was continued during 48 hours under the same conditions. The contents of all the flasks were combined and the whole was extracted 3 times with methylene dichloride. The extract was dried over anhydrous sodium sulfate and evaporated to dryness. The residue was chromatographed on a silica-gel celite column. The factions eluted with chloroform afforded estrone, identical to an authentic sample, in 85% yield.

EXAMPLE II

The preceeding example was repeated, but using an agar-glycerol medium (3 g. of meat extract, 5 g. of peptone, 60 g. of glycerol, 1000 cc. of distilled water and 15 g. of agar) to obtain the vegetative growth of the microorganism, and a nutrient broth of glycerol (3 g. of meat extract, 5 g. of peptone, 60 g. of glycerol and 1000 cc. of distilled water) for the incubation with the steroid, thus yielding also estrone as sole product, in 80% yield.

EXAMPLE III

Example I was repeated but using a Mycophil agar medium (10 g. of Phytone, 10 g. of glucose, 1000 cc. of distilled water and 15 g. of agar), to obtain the vegetative growth of *Mycobacterium phlei*; besides, for the incubation with the steroid there was used Mycophil broth (10 g. of Phytone, 10 g. of glucose and 1000 cc. of distilled water). In this case, the yield of estrone was 70%.

EXAMPLE IV

In the method of Example I there was used a culture of *Mycobacterium phlei* ATCC 10142 as oxygenating microorganism, to produce estrone in 72% yield.

EXAMPLE V

Example I was repeated but using a culture of *Mycobacterium phlei* ATCC 11728 as oxidating agent. In this case the yield of estrone was of 70% with respect to the weight of starting material.

EXAMPLE VI

The method of Example I was repeated in all its details except one, that is, substituting $\Delta^5$-androstene 3$\beta$,19-diol-17-one by the starting materials listed herein after in column I, thus yielding the corresponding $\Delta^{1,3,5(10)}$-3-hydroxy steroids set forth in column II:

| I | II |
|---|---|
| 19-acetate of $\Delta^5$-androstene-3$\beta$,17$\beta$,19-triol. | Estrone. |
| 3,17,diacetate of $\Delta^5$-androstene-3$\beta$,17$\beta$,19-triol. | Do. |
| 17$\alpha$-methyl-$\Delta^5$-androstene-3$\beta$,17$\beta$,19-triol. | 17$\alpha$-methylestradiol. |
| 17$\alpha$-vinyl-$\Delta^5$-androstene-3$\beta$,17$\beta$,19-triol. | 17$\alpha$,vinylestradiol. |
| 17$\alpha$-ethinyl-$\Delta^5$-androstene-3$\beta$,17$\beta$,19-triol. | 17$\alpha$-ethinylestradiol. |
| $\Delta^5$-pregnene-3$\beta$,19-diol-20-one. | $\Delta^{1,3,5(10)}$-19-nor-pregnatrien-3-ol-20-one. |
| 3-acetate of $\Delta^5$-pregnene-3$\beta$,19-diol-20-one. | $\Delta^{1,3,5(10)}$-19-nor-pregnatrien-3-ol-20-one. |
| 3,19-diacetate of $\Delta^5$-pregnene-3$\beta$,19-diol-20-one. | $\Delta^{1,3,5(10)}$-19-nor-pregnatrien-3-ol-20-one. |
| 16$\alpha$-methyl-$\Delta^5$-pregnene-3$\beta$,19-diol-20-one. | 16$\alpha$-methyl-$\Delta^{1,3,5(10)}$-19-nor-pregnatrien-3-ol-20-one. |
| 3-acetate of 16$\beta$-methyl-$\Delta^5$-pregnene-3$\beta$,19-diol-20-one. | 16$\beta$-methyl-$\Delta^{1,3,5(10)}$-19-nor-pregnatrien-3-ol-20-one. |
| 3,19-diacetate of 16$\alpha$,17$\alpha$-isopropylidenedioxy-$\Delta^5$-pregnene-3$\beta$,19-diol-20-one. | 16$\alpha$,17$\alpha$-isopropylidenedioxy-$\Delta^{1,3,5(10)}$-19-nor-pregnatrien-3-ol-20-one. |
| 3,17,19-triacetate of $\Delta^5$-pregnene-3$\beta$,17$\alpha$,19-triol-20-one. | $\Delta^{1,3,5(10)}$-19-nor-pregnatriene-3,17$\alpha$-diol-20-one. |
| 17,20;20,21-bismethylenedioxy $\Delta^5$-pregnene-3$\beta$,19-diol-11-one. | 17,20;20,21-bismethylenedioxy-$\Delta^{1,3,5(10)}$-19-nor-pregnatrien-3-ol-11-one. |
| 19-hydroxydiosgenin. | $\Delta^{1,3,5(10)}$-22a-spirostatrien-3-ol. |
| 3-acetate of 19-hydroxydiosgenin. | $\Delta^{1,3,5(10)}$-22a-spirostatrien-3-ol. |

I claim:

1. A process for the production of a $\Delta^{1,3,5(10)}$-3-hydroxy steroid which comprises subjecting a steroid selected from the group consisting of $\Delta^5$-3$\beta$,19-dihydroxy steroids, the 3-monoacylates thereof, the 19-monoacylates thereof, and the 3,19-diacylates thereof, of the androstane, pregnane and sapogenin series to the aromatizing action of the enzymes produced by *Mycobacterium phlei* and isolating the ring A aromatic steroid thereby formed.

2. The process of claim 1 wherein the action of the enzymes is effected by incubating the starting steroid with *Mycobacterium phlei*.

3. The process of claim 1 wherein the *Mycobacterium phlei* is the strain W of Rutgers University.

4. The process of claim 1 wherein the *Mycobacterium phlei* is the strain ATCC 10142.

5. The process of claim 1 wherein the *Mycobacterium phlei* is the strain ATCC 11728.

6. The process of claim 1 wherein the starting compound is $\Delta^5$-androstene-3$\beta$,19-diol-17-one and the final compound is estrone.

7. The process of claim 1 wherein the starting material is the 3-monoacetate of $\Delta^5$-androstene-3$\beta$ 19-diol-17-one and the final compound is estrone.

8. The process of claim 1 wherein the starting compound is the 3,19-diacetate of $\Delta^5$-androstene-3β,19-diol-17-one and the final compound is estrone.

9. The process of claim 1 wherein the starting material is $\Delta^5$-androstene-3β,17β,19-triol and the final compound is estrone.

10. The process of claim 1 wherein the starting material is the 19-monoacetate of $\Delta^5$-androstene-3β,17β,19-triol and the final compound is estrone.

11. The process of claim 1 wherein the starting compound is the 3,17-diacetate of $\Delta^5$-androstene-3β,17β,19-triol and the final compound is estrone.

12. The process of claim 1 wherein the starting compound is 17α-methyl-$\Delta^5$-androstene-3β,17β,19-triol and the final compound is 17α-methyl-estradiol.

13. The process of claim 1 wherein the starting material is 17α-vinyl-$\Delta^5$-androstene-3β,17β,19-triol and the final compound is 17α-vinyl estradiol.

14. The process of claim 1 wherein the starting material is 17α-ethinyl-$\Delta^5$-androstene-3β,17β,19-triol and the final compound is 17α-ethinyl-estradiol.

15. The process of claim 1 wherein the starting material is $\Delta^5$-pregnene-3β,19-diol-20-one and the final compound is $\Delta^{1,3,5(10)}$-19-nor-pregnatrien-3-ol-20-one.

References Cited

UNITED STATES PATENTS

| 3,023,229 | 2/1962 | Muir et al. | 195—51 X |
| 3,067,212 | 12/1962 | Bowers et al. | 195—51 X |
| 3,189,528 | 6/1965 | Smith et al. | 195—51 |

ALVIN E. TANENHOLTZ, *Primary Examiner.*